March 19, 1963

W. H. HORTON ETAL 3,081,683

PHOTOGRAPHIC SHUTTER

Filed March 17, 1960

3 Sheets-Sheet 1

William H. Horton
Edward L. Sturm
Chester W. Michatek
INVENTORS

BY R. Frank Smith

Karl T. ...
ATTORNEYS

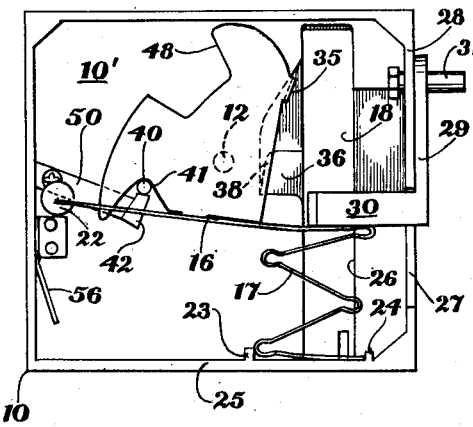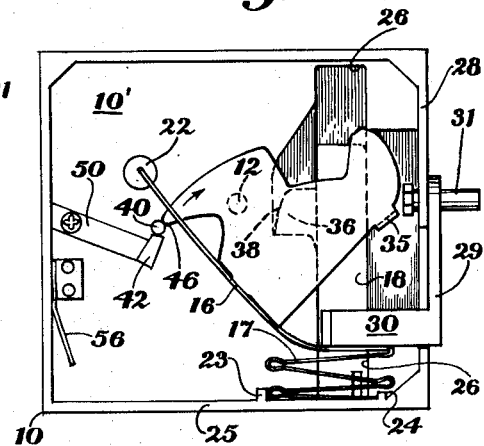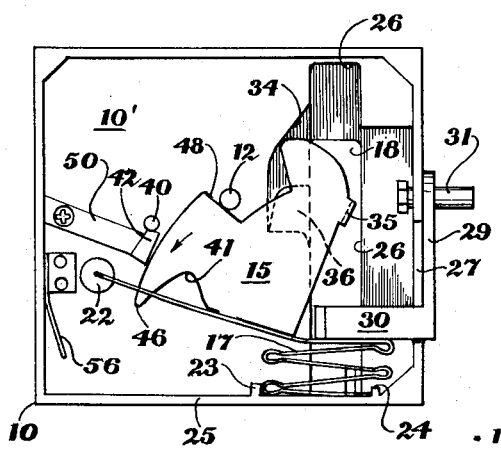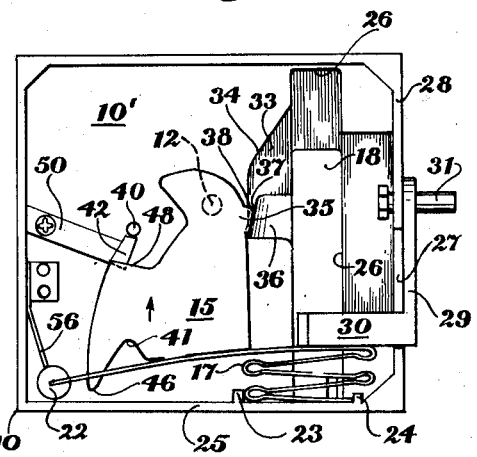

March 19, 1963 W. H. HORTON ETAL 3,081,683
PHOTOGRAPHIC SHUTTER
Filed March 17, 1960 3 Sheets-Sheet 3

William H. Horton
Edward L. Sturm
Chester W. Michatek
INVENTORS

BY
ATTORNEYS

United States Patent Office 3,081,683
Patented Mar. 19, 1963

3,081,683
PHOTOGRAPHIC SHUTTER
William H. Horton, Edward L. Sturm, and Chester William Michatek, Rochester, N.Y., assignors to Eastman Kodak Company, Rochester, N.Y., a corporation of New Jersey
Filed Mar. 17, 1960, Ser. No. 15,667
15 Claims. (Cl. 95—59)

This invention relates to photography, and particularly to shutters for photographic cameras.

One object of the present invention is to provide a simple shutter developed primarily for single lens box cameras. Another object is to provide a simple shutter of the type described which consists of one basic part with an attached inertia weight. A further object is to provide a shutter of the type described in which embodied in said one basic part are such conventional elements as the shutter blade, cover blade, drive spring and return spring. Still another object is to provide a simple shutter of the type described which is adapted to selectively give different speeds. And yet another object is to provide a shutter of the type described which has a positive rebound stop means. And another object is to provide a shutter which is very inexpensive to produce, while being efficient in operation, because the assembly cost is reduced to a minimum.

Figure 1:
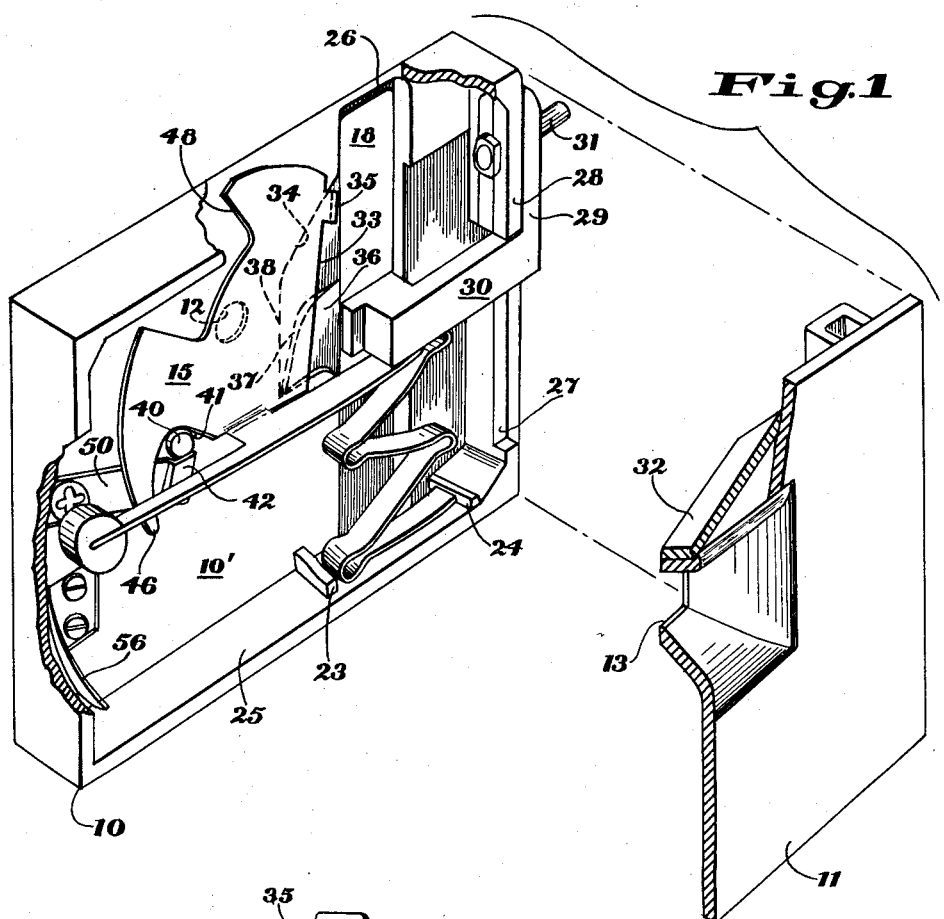
Figure 2:
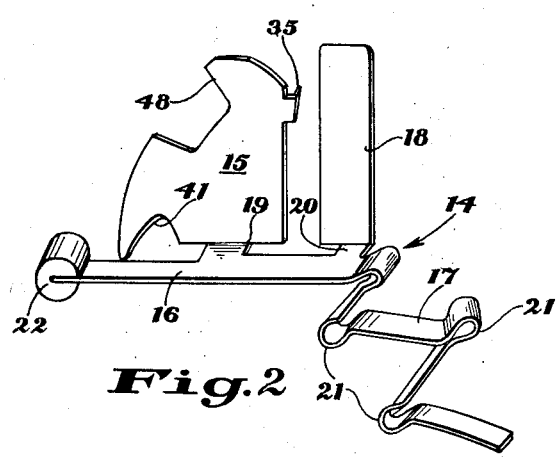
Figure 7:
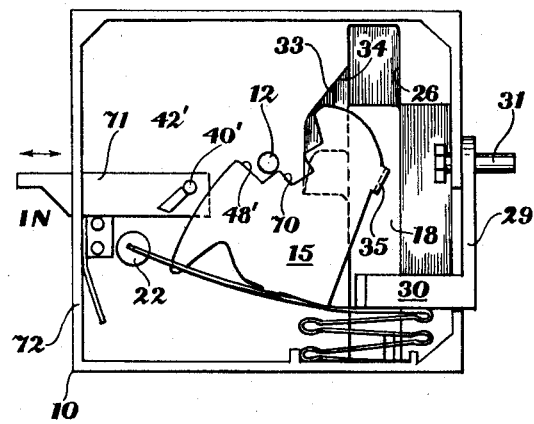
Figure 8:
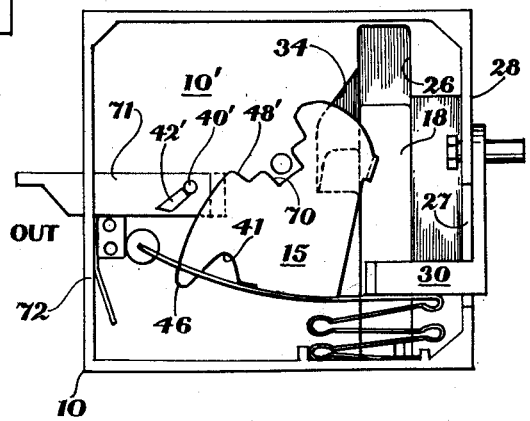
Figure 9:
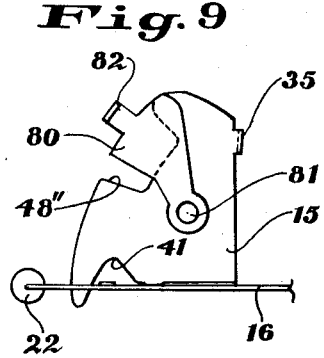

The novel features that we consider characteristic of our invention are set forth with particularity in the appended claims. The invention itself, however, both as to its organization and its mode of operation, together with additional objects and advantages thereof, will best be understood from the following description when read in connection with the accompanying drawings, in which:

FIG. 1 is an exploded perspective view showing a shutter constructed in accordance with a preferred embodiment of the present invention;

FIG. 2. is a perspective view showing the one basic part of the shutter which forms the shutter blade, cover blind, drive spring, return spring;

FIGS. 3, 4, 5 and 6 are elevational views depicting the operating cycle of the shutter. FIG. 3 shows the shutter in a rest position; FIG. 4 shows the shutter in a cocked position; FIG. 5 shows the shutter part way through its exposure making cycle; and FIG. 6 shows the shutter in an intermediate position which it reaches at the end of an exposure cycle with the trigger still depressed;

FIGS. 7 and 8 show an embodiment of the shutter adapted for selectively producing two different speeds; and FIG. 9 is an elevational view of another embodiment of the shutter adapted for selectively obtaining different speeds.

Referring now to FIGS. 1–6 the shutter blade mechanism is housed in a casing 10 which may form all or a part of the front wall of the body of a box camera, not shown, and which may be molded from any suitable plastic material. The casing 10 may be closed by a cover 11 which can be attached to the casing in any suitable manner after the shutter mechanism is assembled therein. The bottom wall 10′ of the casing 10 is provided with the usual exposure aperture 12 and the cover 11 has an opening 13 aligned therewith and in or over which the conventional objective, not shown, may be situated.

Situated within the casing 10 is a basic shutter component 14 of the form best shown in FIG. 2 and which consists of a single blade 15, which forms both the shutter blade and cover blind, a drive spring 16 for the shutter, a return spring 17 and a guide member 18. These several parts are stamped out of a single piece of spring steel, or other material which will have the necessary resiliency to provide the drive and return springs 16 and 17, respectively. The blade 15 and guide 18 are turned up in perpendicular relation to drive spring 16 and are connected thereto by tabs 19 and 20, respectively. The return spring 17 is formed with hair-spring like turns 21 in order to prevent this spring from taking a set, a condition which is prevalent by reason of the fact that it is tightly compressed during operation of the shuter and may be inadvertently held in this compressed condition as will be apparent from the following description. Fixed to the free end of the drive spring 16 is an inertia member 22 in the form of a split lead weight which is clinched onto the end of the spring.

As clearly shown in FIG. 1 the basic shutter component 14 is laid in the casing 10 with the bottom reach of return spring confined between lugs 23 and 24 on the lower side wall 25 of the casing, with the guide member 18 slidably confined by a vertical groove 26 formed in the bottom wall of the casing and with the blade 15 covering the exposure aperture 12. Slidably mounted in a slot 27 in the side wall 28 of the casing is a trigger member 29 which moves between the rest position shown in FIG. 3 to the depressed position shown in FIGS. 5 and 6 during cocking and release of the shutter and then back to the rest position to ready the shutter for a subsequent exposure as will be described hereinafter. The trigger includes an arm portion 30 which rests on top of the uppermost reach of the return spring 17 and confines the guide 18 to sliding movement in the groove 26. It also includes a finger member 31 extending to the outside of the casing which the operator engages to actuate the shutter. When the cover 11 is put on the casing 10 it confines the shutter trigger member 29 to merely a sliding movement within the casing. The cover also includes a partition 32, the inner edge of which lies close to the shutter blade 15 when the cover 11 is mounted on the casing to confine the blade to free movement substantially in its own plane while allowing a slight movement thereof laterally of its plane but not enough to permit the shutter blade to spring out of operative relation with parts on the bottom wall of the casing as will be apparent as the description of the shutter operation progresses.

Also formed in the bottom wall of the casing is a recess 33 which is adjacent groove 26 but is not as deep as groove 26 so as to destroy the guiding function of the walls of groove 26 for guide 18 and the end of arm 30 on the trigger. The upper portion 34 of the wall of the recess is inclined toward the groove 26 to cooperate with a turned-down ear 35 on the shutter blade and control a portion of the movement of the blade as will be clearly set forth. In the lower end of the recess 33 there is formed an inclined dampening ramp 36 rising up from the groove 26 and terminating in a wall 37 spaced from the wall of the recess to provide a slot 38 into which the ear 35 on the blade 15 can drop at the end of an exposure to provide a rebound stop for the shutter blade as will be explained more fully below.

Sticking up from the bottom wall of the casing is a blade pivot post 40 which in the normal or rest position of the shutter is adapted to engage an arcuate cutout 41 in the lower edge of the blade, see FIGS. 1 and 3. Adjacent the lower side of post 40 there is a blade return ramp 42 up which the blade rides to get over post 40 in returning to its rest position.

Having now set forth all, or most, of the parts making up the shutter mechanism, the cycle of operation of the shutter will be described by reference to FIGS. 3–6. FIG. 3 shows the shutter in its rest position wherein the blade 15 covers the exposure aperture 12, the edge of the arcuate cutout 41 engages the top of pivot post 40, and the return spring 17 is expanded to raise the trigger member 29 to its uppermost position. Now to make an exposure the trigger member 29 is pressed downwardly by applying pressure to finger piece 31 to compress return spring 17. This causes the right end of the drive spring 16 and the right lower corner of the blade 15 connected thereto to move downwardly. However, because of the interference between the pivot post 40 and the arcuate cutout 41 in the blade, the blade is caused to pivot in the direction of the arrow in FIG. 2 and tension the drive spring 16. This is the cocking movement of the shutter and during this movement the blade 15 maintains the exposure aperture covered and then acts as a conventional cover blind. In FIG. 4 the shutter is shown in its full cocked position wherein the tip 46 of blade 15 is just about to slip off of the pivot post 40.

Additional downward pressure on the trigger slips the tip 46 of blade 15 past pivot post 40 and the tensioned drive spring 16 being released swings the blade 15 downwardly in an arcuate path designated by the arrow in FIG. 5. During this movement, as will be apparent in FIG. 5, which shows the blade part way through its exposure making movement, an arcuate exposure slot 48 in the blade 15 is moved across the exposure aperture 12 to make the exposure. As is well known, the length of the exposure slot in the shutter and the speed of travel of the shutter blade will determine the exposure time. The angular acceleration of the blade is restricted to the desired exposure value by the retarding action of the inertia weight 22 carried by the drive spring. If the shutter is to be provided with a built-in flash synchronizer, one side of the flash circuit, not shown, may be directly connected to the shutter blade while the other side of the circuit is connected to a flexible metal strap 50 fixed to the bottom of the casing and terminating in the inclined blade return ramp portion 42 lying in the path of the blade 15 and below the pivot post 40. The flash circuit is completed immediately after the blade 15 slips off the pivot post 40 as the edge of the blade moves under and wipes the ramp end 42 of the contact strap 50.

FIG. 6 shows the position of the blade and its operating mechanism in an intermediate position after the completion of the exposure cycle. The blade has reached its limit of travel by the ear 35 on the blade riding up the inclined dampening ramp 36 and engaging the wall 34 of the recess 33 in the bottom of the casing. In so doing the ear drops into the slot 38 and is confined by wall 37 of the ramp to prevent rebound of the shutter. The return spring 17 is completely depressed and will return the blade vertically, as shown by the arrow, to its position of rest shown in FIG. 3, just as soon as the trigger member 29 is released. The blade return ramp 42 cams the blade up over the pivot post 40 during its return to the normal rest position so that it can again drop down behind pivot post 40. The guide 18 engaging groove 26 in the bottom of the casing, and ear 35 on the blade engaging wall 34 of the recess 33 insure that the blade 15 is properly constrained in its return travel to its rest position and properly positioned over the pivot post 40. The exposure aperture 12 remains covered by the blade during this return cycle and during which movement it is then functioning as a cover blind. In order to prevent the inertia member 22 from striking the lower wall 25 of the casing with such impact that it might tend to rebound, there is provided a light dampening spring 56, of the shape best shown in FIGS. 3–6, which is fastened to the bottom wall of the casing and extends into the path of the inertia member. This spring is so located that it is not engaged by the inertia member 22 until the shutter blade has moved far enough to complete the exposure, hence its dampening action on the inertia member does not affect the exposure time. As the inertia member wipes across the dampening spring 56 it is slowed thereby and, in the intermediate position of the shutter, winds up behind the end of the spring 56, see FIG. 6, so that it is held against rebound. By reason of the lightness of dampening spring 56 and the flexibility of drive spring 16, when the shutter is allowed to return to its rest position by release of the trigger, inertia member 22 will readily be forced past spring 56 by the action of return spring 17. Any tendency the blade 15 might have to jump out of operative relation with pivot post 40, wall 34 of recess 33, and ramps 36 and 42 is prevented by partition 32 and the inner edge of opening 13 on the cover 11 which, when the cover is assembled to the casing, confines the blade to movement substantially in its own plane, except for slight deviations therefrom as caused by ramps 36 and 42, without impeding its normal movement in any way.

While return ramp 42 has been shown and described as constituting a flash contact separately mounted in the casing 10, if the shutter is not to be a flash shutter, the ramp could be molded as an integral part of the bottom wall of the casing. In such a case, the ramp would have to have an undercut, or be otherwise arranged, to allow the edge of the blade to pass the same during the exposure cycle without impeding the blade movement.

From the above description, it will be apparent that a single blade has been made to act as both a cover blind and as a shutter by shifting the pivot point of the blade between the cocking and exposure cycles. In this way, the blade is made to travel over two different paths while being cocked and during the exposure cycle so that an exposure slot in the blade passes over the exposure aperture only during the exposure cycle. An examination of FIGS. 3–6 will show that the imaginary junction between the drive spring 16 and the return spring 17 acts as the pivot point for the blade 15 and that this pivot point is shifted vertically during the time the shutter is cocked and the time it is released for the exposure cycle. It will thus be apparent that the same result could be obtained by pivotally mounting the blade on a pivot which can be shifted between two positions, one for cocking the shutter and the other for the exposure cycle, and providing a blade driving spring separate from the return spring 17, and letting the return spring 17 act merely to return the blade pivot to its shutter cocking position.

While the basic design of the shutter described above has only one speed, normally 1/50 of a second, it may be readily modified to obtain any two predetermined speeds, namely 1/50 sec. and 1/100 sec., as shown in FIGS. 7 and 8. In this modification, the blade 15 is provided with a second exposure slot 70 in side-by-side relation with the exposure slot 48' and which is shorter than exposure slot 48'. The blade pivot post 40' and the blade return ramp 42' are carried by a movable slide 71 slidably mounted in the side wall 72 of the casing 10 and movable between an "in" position, see FIG. 7, and an "out" position, see FIG. 8. Shifting the slide 71 between these two positions shifts the slip-off position of the blade 15 and changes the radius of the arc through which the blade travels during the exposure cycle. With the slide 71 in the "in" position shown in FIG. 7 the trip-off point of the blade is such that exposure slot 48' moves across the exposure aperture 12 to give a 1/50 of a second exposure. With the slide 71 moved to the "out" position, the trip-off point of the blade is adjusted so that the exposure slot 70 will move across the exposure aperture to give a shorter exposure. By properly choosing the length of exposure slot 70 relative to the tension given the drive spring 16 with this location of the trip-off point any shutter speed, i.e., 1/100 of a second, can be obtained.

In FIG. 9 we have shown another possible method of obtaining a range of shutter speeds with the shutter mechanism. The basic design is the same as that described for the embodiment shown in FIGS. 1–6 except for the addition of a movable vane 80 pivotally attached to the blade 15 at 81. Through the use of a lever 82 the position of this vane with respect to the exposure slot 48" can be changed so as to vary the width of the exposure slot through which the exposure aperture 12 is exposed. Suitable means, not shown, would necessarily be provided between the vane 80 and the blade 15 to induce sufficient friction, or other type connection, to maintain the parts in a selected adjusted position during operation of the shutter. As will be apparent, the different shutter speeds are thus determined by the width of the exposure slot in the blade which is in turn determined by the position of the vane 80 relative to the exposure slot 48".

Although we have shown and described certain specific embodiments of our invention, we are aware that many modifications thereof are possible. Our invention, therefore, is not to be limited to the precise details of construction shown and described, but is intended to cover all modifications coming within the scope of the appended claims.

Having thus disclosed our invention, what we claim is new and novel and desire to secure by Letters Patent of the United States is:

1. In a photographic shutter the combination with a casing provided with an exposure aperture; of a single blade provided with an exposure slot and adapted to serve both as a cover blind and as a shutter; means for mounting said blade in said casing to move over a first path from a rest position to a cocked position in which it covers said exposure aperture as well as during movement thereto, then over a second path from said cocked position to an intermediate position during which movement the exposure slot in the blade moves completely across said exposure aperture to uncover and recover it to make an exposure, and finally over a third path back to said rest position from said intermediate position while covering said exposure aperture; a drive spring for moving said blade from the cocked position to make an exposure; means for moving said blade from said rest position to said cocked position and including a return spring for moving said blade from said intermediate position to said rest position which is tensioned during the cocking of said shutter.

2. A photographic shutter according to claim 1 characterized in that said single blade, said drive spring and said return spring are formed from a single sheet of material.

3. In a photographic shutter the combination with a casing provided with an exposure aperture; of a single blade provided with an exposure slot, means for mounting said blade in said casing to move from a rest position to a cocked position over one path and during which movement the exposure slot therein does not come into alignment with said exposure aperture and the blade acts as a cover blind, and to move over a different path when moving from said cocked position and during which movement the exposure slot therein moves completely across said exposure aperture and the blade acts as a shutter to make an exposure, and including a compressible spring to which said blade is fixed; a drive spring for driving said blade to make an exposure; and a shutter trigger adapted to compress said spring for moving said blade from its rest position to its cocked position and tensioning said drive spring.

4. A photographic shutter according to claim 3 in which said blade, said compressible spring and said drive spring are all fixedly connected together to form one integral part.

5. A photographic shutter according to claim 3 in which said blade, said compressible spring and said drive spring are formed from a single piece of metal.

6. A photographic shutter according to claim 3 and including an inertia member fixed to said blade so as to retard the movement thereof from its cocked position in order to obtain a given exposure time.

7. A photographic shutter according to claim 3 and including cooperating means between said blade and said casing to positively prevent rebound of the blade as it reaches the end of its exposure making movement.

8. A photographic shutter according to claim 7 in which said cooperating means to prevent blade rebound comprises a ramp on said casing, and a lug on said blade adapted to ride up said ramp during the exposure movement of said blade and adapted to drop down behind the same at the end of the exposure movement.

9. A photographic shutter according to claim 3 and including means for selectively adjusting the exposure time produced by said blade.

10. A photographic shutter according to claim 9 in which said means for selectively adjusting the exposure time produced by said blade comprises a movable vane carried by said blade for varying the length of said exposure slot therein.

11. A photographic shutter according to claim 9 in which said means for selectively adjusting the exposure time produced by said blade comprises providing said blade with a second exposure slot of different length than said first exposure slot in side-by-side relation with said first exposure slot; and means for selectively adjusting said blade mounting means such that the blade in moving from its cocked position will travel over a different path which moves said second exposure slot across said exposure aperture.

12. A photographic shutter according to claim 4 including an inertia member connected to the end of said drive spring; and a dampening spring fixed to said casing and disposed in the path of movement of said inertia member to slow down the movement of said inertia member after the blade has moved far enough to complete the exposure and finally positively hold said inertia member against rebound.

13. In a photographic shutter the combination with a casing provided with an exposure aperture; of a single blade provided with an exposure slot; means for mounting said blade in said casing to move from a rest position to a cocked position over one path and during which movement the exposure slot therein does not come into alignment with said exposure aperture, then from said cocked position to an intermediate position during which movement the slot in said blade moves across said exposure aperture to make an exposure, and finally back to said rest position while covering said exposure aperture, said means including a blade supporting arm in said casing to which said blade is fixed and which in the rest position of said blade extends substantially at right angles to and to one side of the optical axis of said exposure aperture; means for pivotally mounting said supporting arm at a point radially spaced from said exposure aperture; means for biasing said arm to swing in one direction about said pivotal mounting means, means for slidably mounting the pivotal mounting of said supporting arm to move in a path disposed substantially at right angles to said arm when the blade is in its rest position; a return spring normally urging said pivotal mounting into the position it assumes when said blade is in its rest position; a trigger for moving the pivotal mounting of said blade supporting arm against said return spring to move said blade to its cocked position; cooperating parts on said blade and casing which constrain said blade to swing about its pivotal mounting so as to maintain the exposure aperture covered during this movement and then disengage to allow the blade to swing back to said intermediate position under the action of said bias means to make an exposure, said return spring then acting to move said blade supporting arm and blade to said rest position; and means for bringing said cooperating parts on said blade and casing back into said cooperating relation when said blade returns to its rest position.

14. A photographic shutter according to claim 13 characterized in that said blade supporting arm, pivotal mounting, biasing means; slidable support for said pivotal means and return spring comprise a single metal spring located in said casing.

15. In a photographic shutter the combination with a casing provided with an exposure aperture; of a single blade provided with an exposure slot and adapted to serve both as a cover blind and as a shutter; means for mounting said blade in said casing to move from a rest position to a cocked position while covering said exposure aperture, then from said cocked position to an intermediate position during which movement the exposure slot in the blade moves completely across said exposure aperture to make an exposure, and finally back to said rest position while covering said exposure aperture; a drive spring for moving said blade from the cocked position to make an exposure; means for moving said blade from said rest position to said cocked position and including a return spring for moving said blade from said intermediate position to said rest position which is tensioned during the cocking of said shutter; and an inertia member connected with said single blade for retarding the speed of movement of said blade between said cocked and intermediate positions in order to obtain a given exposure time.

References Cited in the file of this patent

UNITED STATES PATENTS

| | | |
|---|---|---|
| 440,583 | Barker | Nov. 11, 1890 |
| 509,841 | Casler | Nov. 28, 1893 |
| 2,153,153 | Nelson | Apr. 4, 1939 |